US012587329B2

(12) United States Patent
Bae et al.

(10) Patent No.: US 12,587,329 B2
(45) Date of Patent: Mar. 24, 2026

(54) SYSTEM AND METHOD FOR PROVIDING CHANNEL STATE INFORMATION REFERENCE SIGNAL POWER DETERMINATION IN UNLICENSED SPECTRUM

(71) Applicant: Samsung Electronics Co., Ltd., Gyeonggi-do (KR)

(72) Inventors: Jung Hyun Bae, San Diego, CA (US); Hsien-Ping Lin, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 18/118,925

(22) Filed: Mar. 8, 2023

(65) Prior Publication Data

US 2023/0224117 A1      Jul. 13, 2023

Related U.S. Application Data

(63) Continuation of application No. 17/128,461, filed on Dec. 21, 2020, now Pat. No. 11,626,949.

(Continued)

(51) Int. Cl.
H04W 72/04        (2023.01)
H04L 5/00        (2006.01)
(Continued)

(52) U.S. Cl.
CPC ........... H04L 5/0048 (2013.01); H04W 24/10 (2013.01); H04W 72/23 (2023.01)

(58) Field of Classification Search
CPC . H04W 24/10; H04W 72/23; H04W 74/0808; H04W 72/0446; H04L 5/0048;
(Continued)

(56) References Cited

U.S. PATENT DOCUMENTS 10,219,159 B2    2/2019  Baek et al.
10,560,979 B2    2/2020  You et al.
(Continued)

FOREIGN PATENT DOCUMENTS

EP        3 281 350        2/2018
EP        3 081 046        8/2018
(Continued)

OTHER PUBLICATIONS

Zte ( Details of Design on DL frame structure and signaling for LAA, R1-156988, Anaheim, USA, Nov. 15-22, 2015 ) (Year: 2015).*

(Continued)

*Primary Examiner* — Maharishi V Khirodhar
(74) *Attorney, Agent, or Firm* — The Farrell Law Firm, P.C.

(57)        ABSTRACT

A method of a user equipment (UE) in a wireless communication network and a UE are provided. The method includes receiving, from the network, at least one downlink (DL) transmission, determining, by the UE, channel resource information reference signal (CSI-RS) occasions in the at least one DL transmission, determining, by the UE, whether a power of each of the CSI-RS occasions is the same, and averaging, by the UE, corresponding measurements when the power of each of the CSI-RS occasions is determined to be the same.

12 Claims, 5 Drawing Sheets

Related U.S. Application Data

(60) Provisional application No. 63/109,028, filed on Nov. 3, 2020, provisional application No. 63/107,892, filed on Oct. 30, 2020, provisional application No. 63/000,064, filed on Mar. 26, 2020, provisional application No. 62/977,024, filed on Feb. 14, 2020.

(51) Int. Cl.

| | |
|---|---|
| *H04W 24/10* | (2009.01) |
| *H04W 72/23* | (2023.01) |
| *H04W 76/00* | (2018.01) |
| *H04W 88/08* | (2009.01) |

(58) Field of Classification Search
CPC ..... H04L 5/0053; H04L 5/005; H04L 5/0082; H04B 17/26; H04B 17/327; H04B 7/0626
USPC ......................................................... 370/329
See application file for complete search history.

(56) References Cited

U.S. PATENT DOCUMENTS

| | | | |
|---|---|---|---|
| 10,750,394 | B2 | 8/2020 | Bhorkar et al. |
| 11,626,949 | B2 * | 4/2023 | Bae .......................... H04L 5/005 |
| | | | 370/329 |
| 2017/0085345 | A1 * | 3/2017 | Dinan ............... H04W 72/0453 |
| 2018/0279144 | A1 | 9/2018 | Mukherjee et al. |
| 2018/0310193 | A1 * | 10/2018 | Bhorkar ................. H04B 7/063 |
| 2020/0146058 | A1 * | 5/2020 | Xu ..................... H04W 72/0453 |
| 2021/0235492 | A1 * | 7/2021 | Iyer ........................ H04W 72/23 |
| 2022/0353894 | A1 * | 11/2022 | Nogami ................ H04L 5/0053 |

FOREIGN PATENT DOCUMENTS

| | | | | |
|---|---|---|---|---|
| WO | WO-2016117985 | A1 * | 7/2016 | ........... H04L 5/0098 |
| WO | WO 2016/163854 | | 10/2016 | |

OTHER PUBLICATIONS

LG Electronics ( R1-1912387, Reno, USA, Nov. 18-22, 2019, Physical layer design of DL signals and channels for NR-U) (Year: 2019).*

ETIS TS 136 213 V14.2.0 (Apr. 2017), LTE; Evolved Universal Terrestrial Radio Access (E-UTRA); Physical layer procedures (3GPP TS 36.213 version 14.2.0 Release 14) (Year: 2017).*

NTT DOCOMO, supplied via IDS (R1-157224, discussion on L1 signaling design for LAA) (Year: 2015).*

ETRI (CSI measurement and report for LAA, R1-154392) (Year: 2015).*

MediaTek (R1-2001902, Apr. 20-30, 2020, "Remaining issues DL signals and channels for NR-U"). (Year: 2020).*

Zte ( Details of Design on DL frame structure and signaling for LAA, R1-156988, Anaheim, USA, Nov. 15-22, 2015, provided in the last office action). (Year: 2015).*

Zte, "Details of Design on DL Frame Structure and Signaling for LAA", R1-156988, 3GPP TSG RAN WG1 Meeting #83, Nov. 15-22, 2015, 11 pages.

NTT DOCOMO, Inc., "Discussion on L1 Signaling Design for LAA", R1-157224, 3GPP TSG RAN WG1 Meeting #83, Nov. 15-22, 2015, 5 pages.

European Search Report dated Jul. 6, 2021 issued in counterpart application No. 21150554.0-1215, 12 pages.

* cited by examiner

400

402 — Receive at least one DL transmission.

404 — Determine CSI-RS occasions in the DL transmission.

406 — Determine whether the power of the CSI-RS transmissions is the same.

408 — Average corresponding measurements when the power of each of the CSI-RS occasions are determined to be the same.

SYSTEM AND METHOD FOR PROVIDING CHANNEL STATE INFORMATION REFERENCE SIGNAL POWER DETERMINATION IN UNLICENSED SPECTRUM

PRIORITY

This application is a Continuation application of U.S. application Ser. No. 17/128,461, filed on Dec. 21, 2020, which is based on and claims priority under 35 U.S.C. § 119(e) to U.S. Provisional Patent Application Ser. No. 62/977,024, filed on Feb. 14, 2020, U.S. Provisional Patent Application Ser. No. 63/000,064, filed on Mar. 26, 2020, U.S. Provisional Patent Application Ser. No. 63/107,892, filed on Oct. 30, 2020, and U.S. Provisional Patent Application Ser. No. 63/109,028, filed on Nov. 3, 2020, the entire contents of which are incorporated herein by reference.

FIELD

The present disclosure is generally related to channel state information reference signal (CSI-RS) power determinations by a user equipment (UE).

BACKGROUND

For New Radio unlicensed spectrum (NR-U), in order to achieve fair coexistence with other technologies using the same unlicensed spectrum, a channel access procedure is considered such that a device needs to sense the channel first and utilize the channel if the channel sensing outcome indicates the channel is available.

SUMMARY

According to one embodiment, a method of a UE in a wireless communication network includes receiving, from the network, at least one downlink (DL) transmission, determining, by the UE, CSI-RS occasions in the at least one DL transmission, determining, by the UE, whether a power of each of the CSI-RS occasions is the same, and averaging, by the UE, corresponding measurements when the power of each of the CSI-RS occasions is determined to be the same.

According to one embodiment, a UE includes a transceiver, a memory, and a processor configured to receive, from a network, at least one DL transmission, determine CSI-RS occasions in the at least one DL transmission, determine whether a power of each of the CSI-RS occasions is the same, and average corresponding measurements when the power of each of the CSI-RS occasions is determined to be the same.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
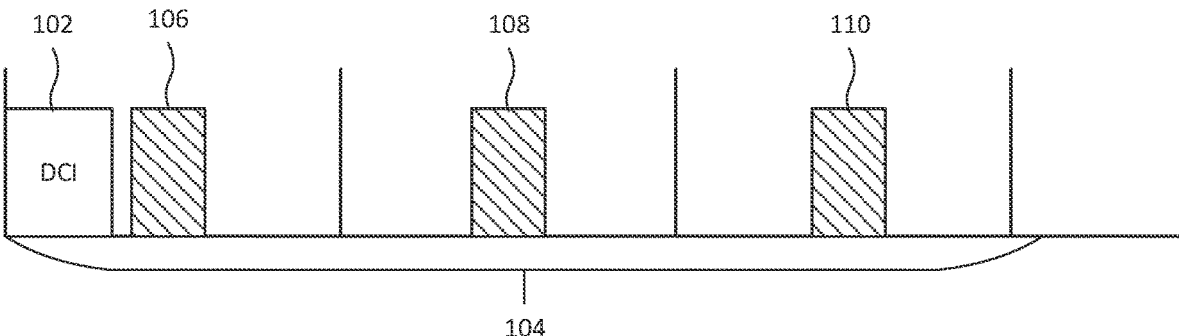
FIG. 1 illustrates a diagram of CSI-RS occasions occurring within a channel occupancy time (COT), according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1'," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The channel access procedure is referred to as listen-before-talk (LBT). Devices which employ LBT can be categorized into load based equipment (LBE) or frame based equipment (FBE). For LBE, channel sensing can occur at any instance for data transmission but a random back-off procedure is applied when the channel is sensed to be busy. For FBE, predetermined periodic channel access opportunities are applied and a fixed duration for data transmission followed by a fixed idle period are associated with each channel sensing. If a channel sensing procedure succeeds in FBE, the disclosed fixed duration for data transmission can be utilized. Otherwise, no access to the channel is allowed until the next channel access opportunity.

According to LBT, a DL transmission is not guaranteed due to an unpredictable channel access procedure outcome at the network. In particular, the available bandwidth for DL transmission may vary at each channel access procedure and the DL transmission power may vary accordingly. Therefore, it is reasonable for a UE to determine the DL transmissions from different channel occupancy durations acquired in different network channel access procedures have different transmission powers and a UE should acknowledge this aspect in the related operation. However, the channel occupancy duration information may not be always known by a UE. One identified operation which is impacted by the lack of channel occupancy duration information is the UE procedure on utilizing CSI-RS power. In a licensed spectrum, a UE can measure CSI-RS power in several reception occasions to improve the estimation of channel noise. Such an operation cannot be easily performed without considering the potential varied transmission power at each reception occasions due to unpredictable channel access status in the unlicensed spectrum. One approach to resolve the issue is to determine the CSI-RS transmission power is different at each occasion. However, such a determination is too conservative and the channel noise estimation performance will be sacrificed.

FIG. 1 illustrates a diagram of CSI-RS occasions occurring within a COT, according to an embodiment. To address the potential CSI-RS power variation issue, available information regarding the COT (or channel occupancy duration) can be utilized by a UE to exploit the reception power of CSI-RS. One useful information is the COT indicated in DCI format 2_0. As shown in FIG. 1, from the DCI 102, the UE can determine the COT 104, and in the example shown in FIG. 1, the CSI-RS occasions 106, 108 and 110 occur within the COT. With the channel occupancy duration information, a UE can know the duration of a channel occupancy acquired by the network and determine the CSI-RS occasions within the indicated channel occupancy duration have the same power.

Figure 2A:
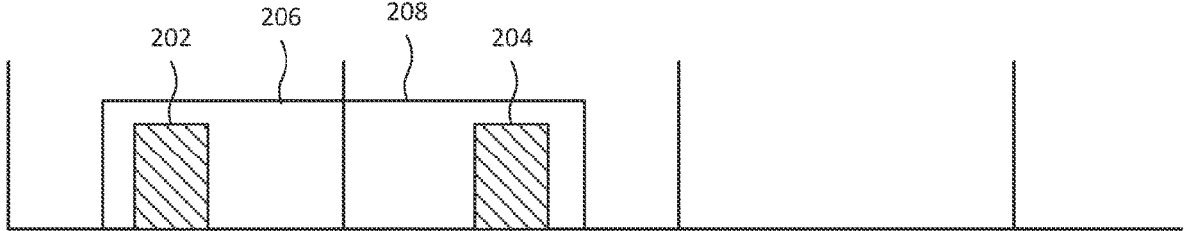
FIGS. 2A and 2B illustrate diagrams of CSI-RS occasions occurring within DL transmissions, according to an embodiment.
Figure 2B:
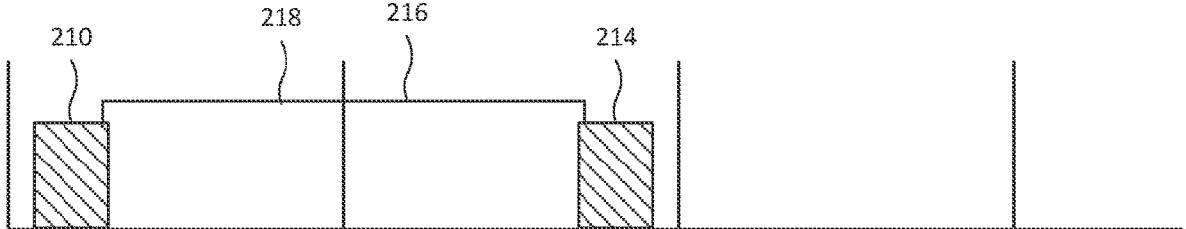

FIGS. 2A and 2B illustrate diagrams of CSI-RS occasions occurring within DL transmissions, according to an embodiment. In FIG. 2A, the CSI-RS occasions 202 and 204 are within two DL transmissions 206 and 208. In FIG. 2B, the CSI-RS occasion 210 occurs before a first DL transmission 212, and the CSI-RS occasion 214 occurs after a second DL transmission 216. The UE may also determine a set of DL transmissions which have a small gap (e.g., about 16 µs) is transmitted within the same channel occupancy from the network. Therefore, a UE can determine the CSI-RS occasions which are part of a set of DL transmissions which has a small gap have the same power.

When the COT information is not available at the UE, the UE may utilize a timer to specify a duration where the network potentially occupies the channel. With the timer, the UE can determine the CSI-RS occasions occur within a duration where the timer is running have the same transmission power. One example of a timer can be the one introduced for the switching groups of search space sets.

Figure 3A:
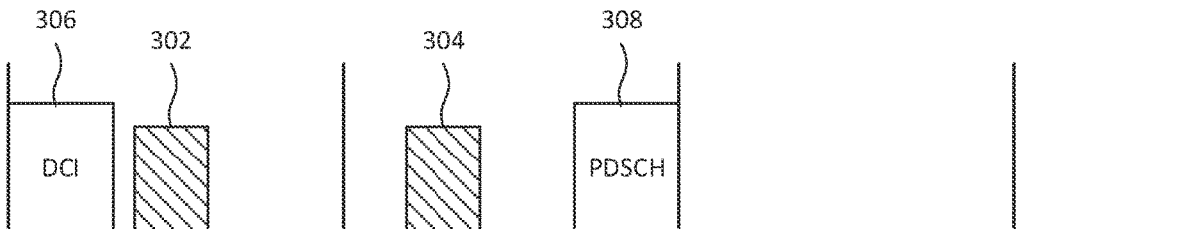
FIGS. 3A and 3B illustrate diagrams of CSI-RS occasions occurring between downlink control information (DCI) and a physical downlink shared channel (PDSCH), according to an embodiment.
Figure 3B:
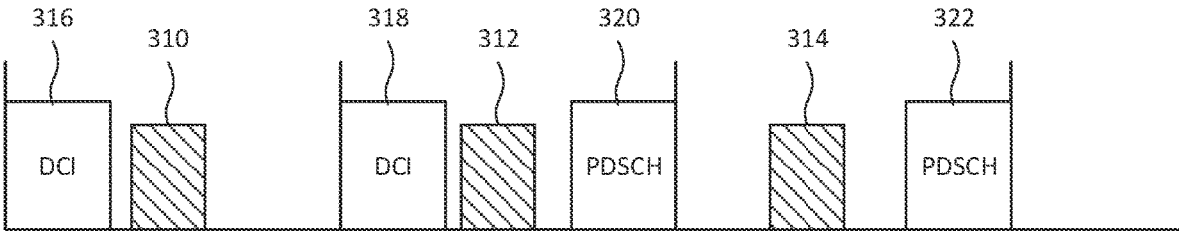

FIGS. 3A and 3B illustrate diagrams of CSI-RS occasions occurring between DCI and a PDSCH, according to an embodiment. The network may include DL transmissions to many UEs in one COT after a successful channel access procedure. In this case, DL transmissions received at each UE could have large gaps even within a single channel occupancy time duration. To address the CSI-RS power determination for this scenario, the UE may determine a dynamic DCI and the scheduled data in a PDSCH are within the same COT. Therefore, the CSI-RS occasions which are part of a set of DL transmissions can be determined to have the same power if the set of DL transmission satisfies certain timing conditions (e.g., all the detected DCIs within the set of DL transmission are received between a detected DCI and the scheduled PDSCH). As shown in FIG. 3A, the CSI-RS occasions 302 and 304 occur between the DCI 306 and the PDSCH 308. Therefore, the UE determines the CSI-RS occasions 302 and 304 to have the same power. In FIG. 3B, the CSI-RS occasion 310 occurs between a first DCI 316 and a first PDSCH 320. The CSI-RS occasion 312 occurs between a second DCI 318 and the first PDSCH 320. The CSI-RS occasion 314 occurs between the second DCI 318 and the second PDSCH 322. Therefore, the UE determines the CSI-RS occasions 310, 312 and 314 to have the same power.

For FBE, due to the nature of the associated channel access procedure, each data transmission duration can be considered as a COT when the associated channel sensing is successful before the data transmission duration. Consequently, a UE can determine CSI-RS occasions occur within the same transmission duration have the same power. In particular, a set of DL transmissions including a group of physical downlink control channels (PDCCHs) and PDSCHs scheduled by them can be reasonably determined to be considered in the same COT if, for every PDCCH in the group except the latest received PDCCH, there is a second PDCCH in the group satisfying that the ending symbol of the second PDCCH is later than or equal to (or not more than 16 us earlier than) the starting symbol of the first PDCCH and the starting symbol of the second PDCCH is earlier than or equal to (or not more than 16 us later than) the ending symbol of the PDSCH scheduled by the first PDCCH.

A UE may determine the CSI-RS transmission powers are the same if the reception occasions are within a channel occupancy duration indicated by a DCI 2_0 or a running timer or configuration, or within a set of DL transmissions which satisfies a certain timing constraint (e.g., a small gap among the transmissions). Otherwise, the UE may determine the CSI-RS transmission power is different at each reception occasion.

If at least one of a slot format indication (SFI) and channel occupancy (CO) duration fields in DCI 2_0 is configured, the UE may average measurements of two or more instances of a periodic or semi-persistent non-zero power (NZP) CSI-RS for a channel measurement or for an interference measurement that occur in the indicated remaining CO duration. The UE may not average measurements of two or more instances of a periodic or semi-persistent NZP CSI-RS for channel measurement or for interference measurement that do not occur in the indicated remaining CO duration.

If neither the SFI nor the CO duration fields in DCI 2_0 are configured but CSI-RS-ValidationWith-DCI-r16 is configured, the UE may average measurements of two or more instances of a periodic or semi-persistent NZP CSI-RS for a channel measurement or for an interference measurement that occur in a time duration for which all OFDM symbols are occupied by a set of PDSCH and/or CSI-RS(s) that are scheduled/triggered to the UE, including the scheduling/triggering PDCCH(s). The UE may not average measurements of two or more instances of a periodic or semi-persistent NZP CSI-RS for channel measurement or for interference measurement that occur in a time duration for which not all orthogonal frequency division multiplexing (OFDM) symbols are occupied by a set of PDSCH and/or CSI-RS(s) scheduled/triggered to the UE, including the scheduling/triggering PDCCH(s).

Figure 4:
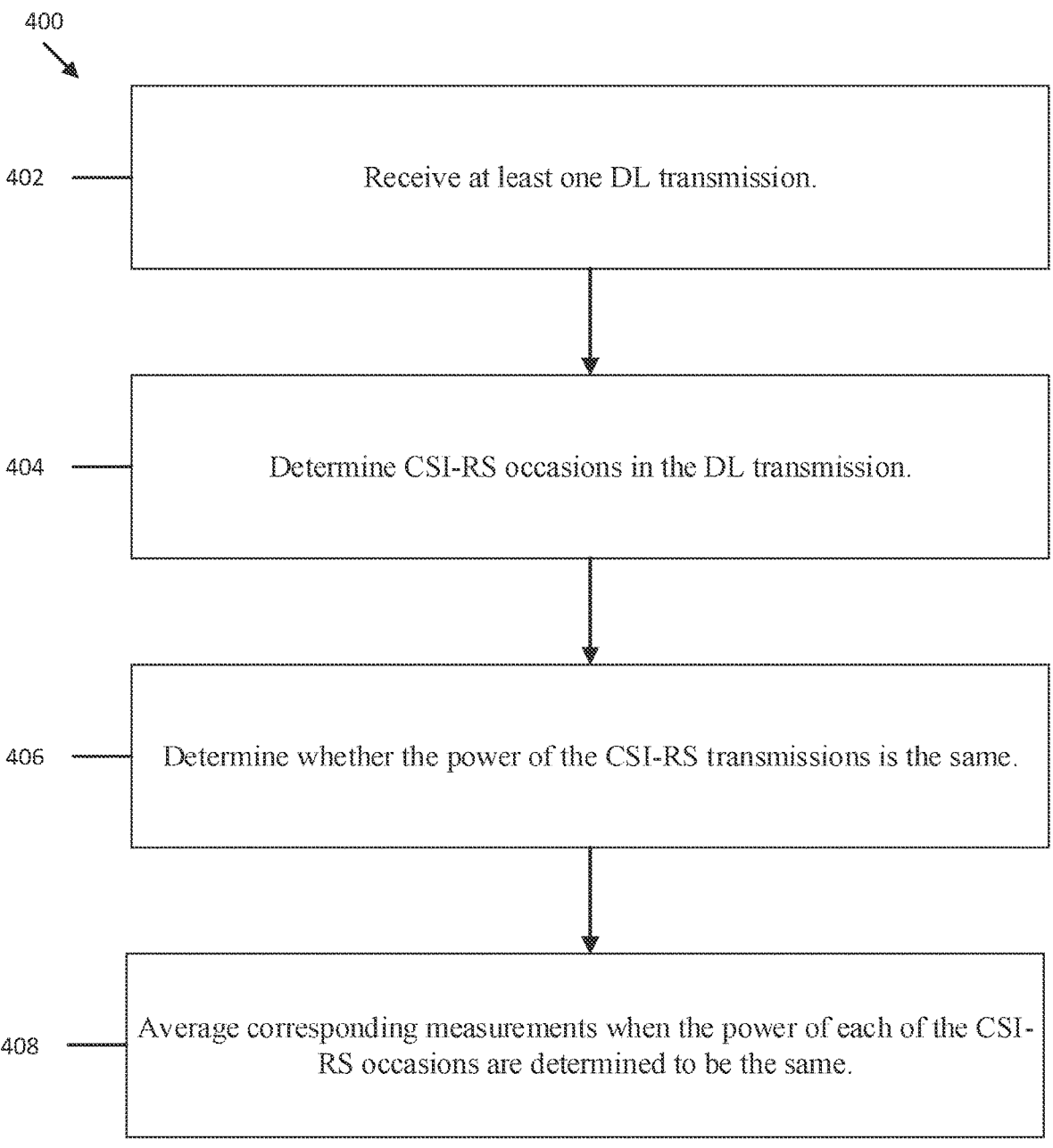
FIG. 4 illustrates a flowchart for a method of operating a user equipment (UE), according to an embodiment.

FIG. 4 illustrates a flowchart 400 for a method of operating a UE, according to an embodiment. At 402, the UE receives at least one DL transmission. At 404, the UE determines CSI-RS occasions in the DL transmission.

At 406, the UE determines whether the power of each of the CSI-RS occasions is the same. The UE may determine the COT for DCI included in the DL transmission, and determine the power of the CSI-RS occasions to be the same when each of the CSI-RS occasions occur within the COT. The UE may receive a set of DL transmissions, and then determine the power of the CSI-RS occasions to be the same when the CSI-RS occasions occur within the set of DL transmissions that are separated by a predetermined gap size. The UE may run a timer for a predetermined duration and determine the power of the CSI-RS occasions to be the same when the CSI-RS occasions occur within the predetermined duration. The UE may determine the power of the CSI-RS occasions to be the same when the CSI-RS occasions occur between a detected DCI and a scheduled PDSCH. The UE may be an FBE, and the UE may determine the power of the CSI-RS occasions to be the same when each of the CSI-RS occasions occur within a predetermined transmission duration.

At 408, UE averages corresponding measurements when the power of each of the CSI-RS occasions is determined to be the same.

For an operation with shared spectrum channel access, if the UE is configured with a CSI-ReportConfig with higher layer parameter reportQuantity set to 'cri-RI-PMI-CQI', 'cri-RI-i1', 'cri-RI-i I-CQI', 'cri-RI-CQI' or 'cri-RI-LI-PMI-CQI', the UE may derive the CSI parameters without averaging two or more instances of any periodic or semi-persistent nzp-CSI-RSResource in the corresponding nzp-CSI-RS-ResourceSet for channel measurement or for interference measurement located in different DL transmissions, where the instances of the nzp-CSI-RSResource are not in the same channel occupancy duration indicated by DCI format 2_0, if the UE is provided at least one of SlotFormatIndicator or CO-DurationList-r16 (e.g., when the CSI-RS occasions are within a COT), or the instances of the nzp-CSI-RSResource occurring in a set of symbols which are not all occupied by PDSCH(s) and/or aperiodic CSI-RS(s) indicated by DCI formats and the corresponding PDSCH(s), if the UE is neither provided with CO-Duration-PerCell-r16 nor SlotFormatIdicator, but is provided with CSI-RS-ValidationWith-DCI-r16 (e.g., when the CSI-RS occasions are part of a set of DL transmissions).

Figure 5:
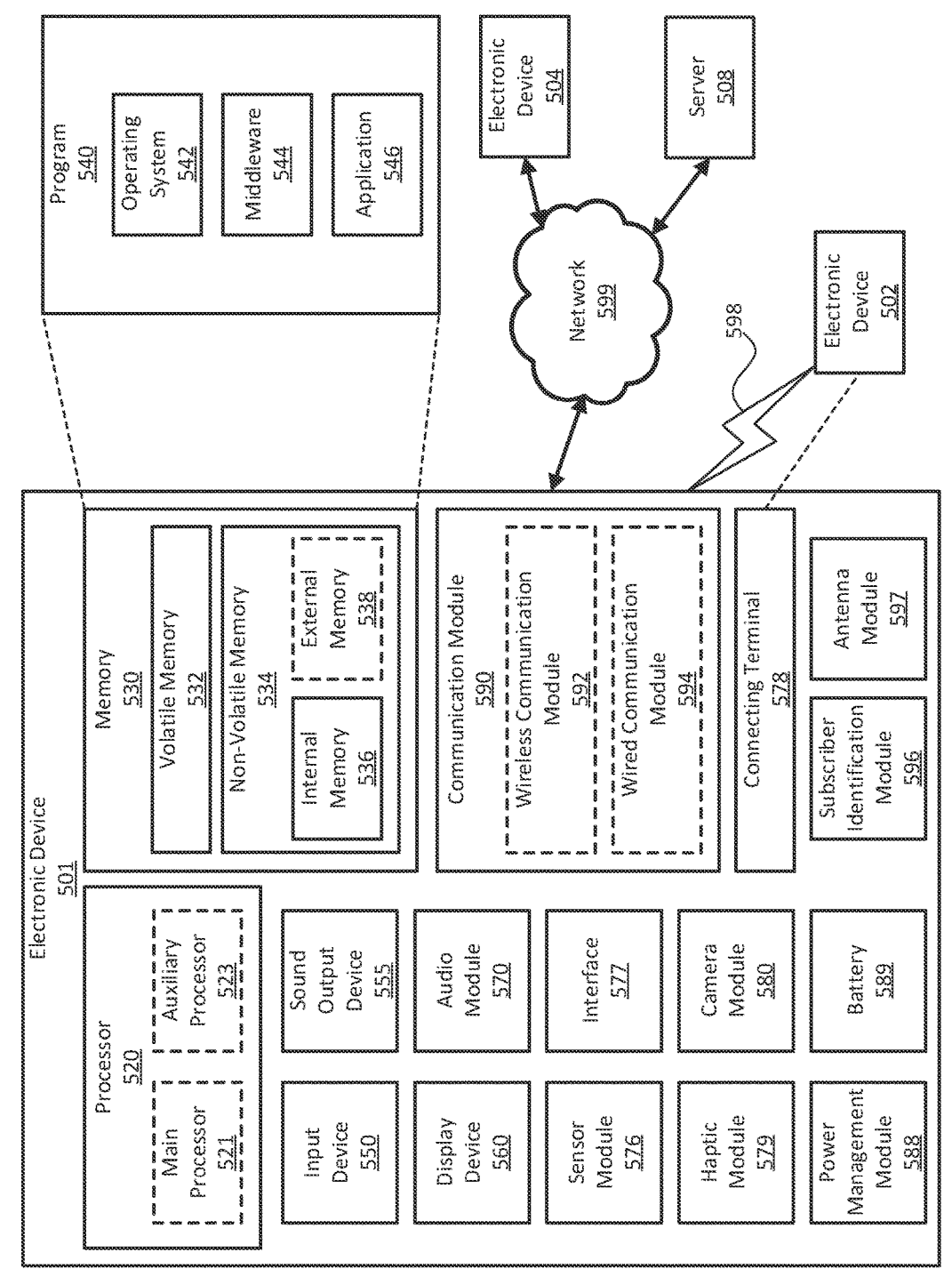
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a user equipment (UE) in a wireless communication network, the method comprising:

receiving, from the network, a set of downlink (DL) transmissions including a first DL transmission and a second DL transmission;

determining, by the UE, a first channel state information reference signal (CSI-RS) occasion occurring at least partially before the first DL transmission and a second CSI-RS occasion occurring at least partially after the second DL transmission;

determining, by the UE, a channel occupancy time (COT) from downlink control information (DCI) included in the set of DL transmissions; and averaging, by the UE, corresponding measurements when both the first CSI-RS occasion and the second CSI-RS occasion occur within the COT, wherein the first DL transmission is contiguous with the second DL transmission.

2. The method of claim 1, wherein a power of the first CSI-RS occasion and the second CSI-RS occasion is determined to be the same when the first CSI-RS occasion and the second CSI-RS occasion occur within the set of DL transmissions.

3. The method of claim 1, further comprising running, by the UE, a timer for a predetermined duration, wherein a power of the first CSI-RS occasion and the second CSI-RS occasion is determined to be the same when the first CSI-RS occasion and the second CSI-RS occasion occur within the predetermined duration.

4. The method of claim 3, wherein the predetermined duration includes a duration for switching groups of search space sets.

5. The method of claim 1, wherein a power of the first CSI-RS occasion and the second CSI-RS occasion is determined to be the same when the first CSI-RS occasion and the second CSI-RS occasion occur between a detected DCI and a scheduled physical downlink shared channel (PDSCH).

6. The method of claim 1, wherein the UE comprises a frame based equipment (FBE), and wherein a power of the first CSI-RS occasion and the second CSI-RS occasion is determined to be the same when the first CSI-RS occasion and the second CSI-RS occasion occur within a predetermined transmission duration.

7. A user equipment (UE), comprising:

a transceiver;

a memory; and a processor configured to:

receive, from a network, a set of downlink (DL) transmissions including a first DL transmission and a second DL transmission;

determine a first channel state information reference signal (CSI-RS) occasion occurring at least partially before the first DL transmission and a second CSI-RS occasion occurring at least partially after the second DL transmission;

determine a channel occupancy time (COT) from downlink control information (DCI) included in the set of DL transmissions; and average corresponding measurements when both the first CSI-RS occasion and the second CSI-RS occasion occur within the COT, wherein the first DL transmission is contiguous with the second DL transmission.

8. The UE of claim 7, wherein a power of the first CSI-RS occasion and the second CSI-RS occasion is determined to be the same when the first CSI-RS occasion and the second CSI-RS occasion occur within the set of DL transmissions.

9. The UE of claim 7, wherein the processor is further configured to run a timer for a predetermined duration, wherein a power of the first CSI-RS occasion and the second CSI-RS occasion is determined to be the same when the first CSI-RS occasion and the second CSI-RS occasion occur within the predetermined duration.

10. The UE of claim 9, wherein the predetermined duration includes a duration for switching groups of search space sets.

11. The UE of claim 7, wherein a power of the first CSI-RS occasion and the second CSI-RS occasion is determined to be the same when the first CSI-RS occasion and the second CSI-RS occasion occur between a detected DCI and a scheduled physical downlink shared channel (PDSCH).

12. The UE of claim 7, wherein the UE comprises a frame based equipment (FBE), and wherein a power of the first CSI-RS occasion and the second CSI-RS occasion is determined to be the same when the first CSI-RS occasion and the second CSI-RS occasion occur within a predetermined transmission duration.

* * * * *